March 19, 1935.   H. W. EIS   1,995,094
LINE DRIVE AND CLUTCH CONTROL FOR TRACTORS
Filed Dec. 4, 1933   3 Sheets-Sheet 1
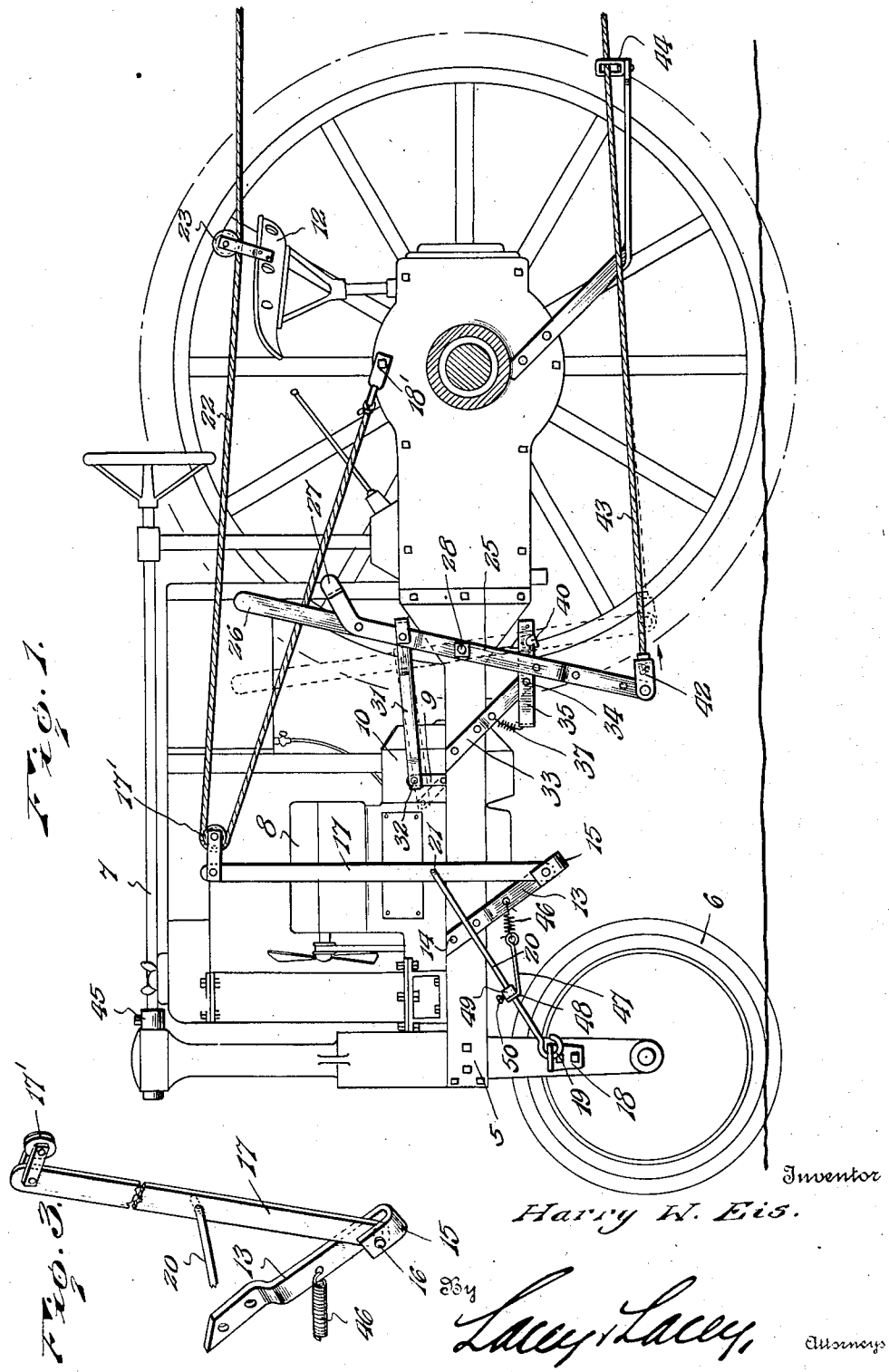

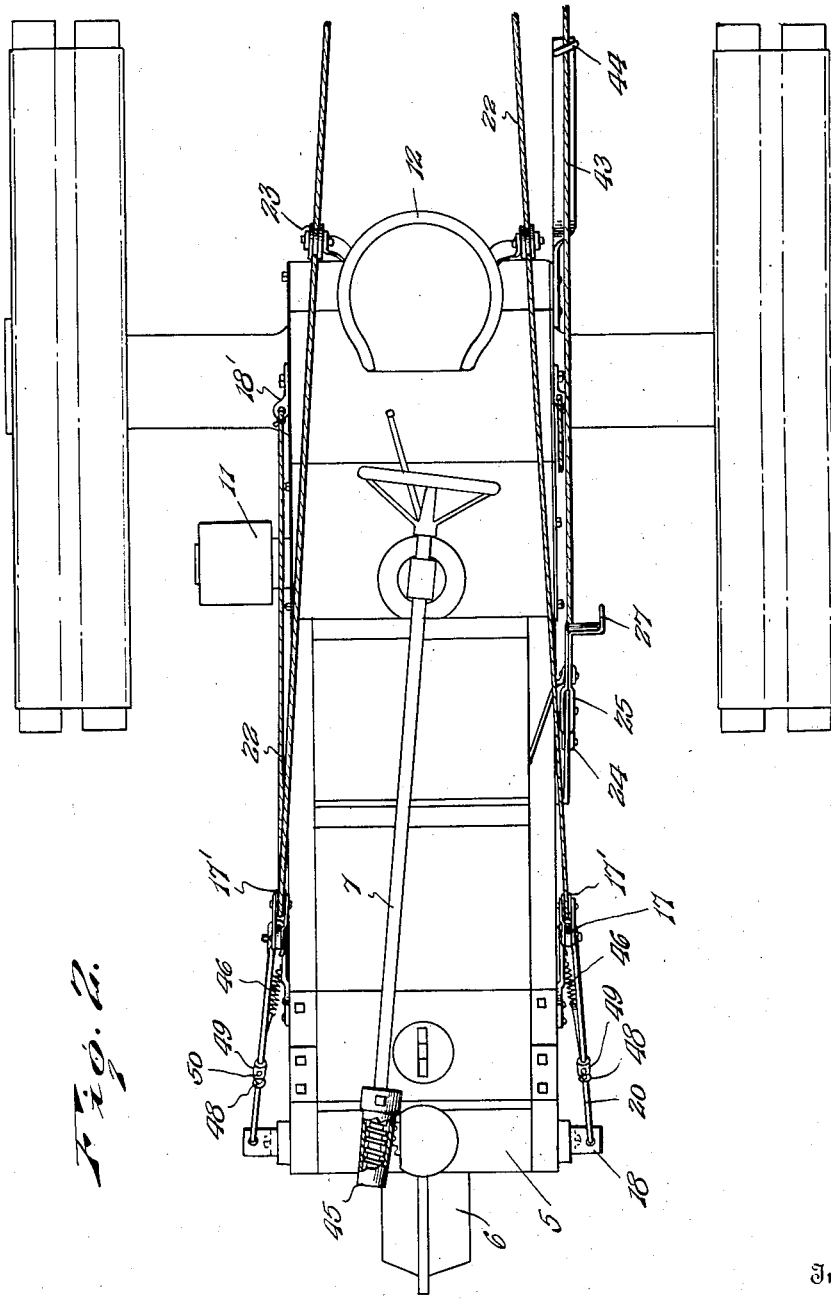

March 19, 1935. H. W. EIS 1,995,094
LINE DRIVE AND CLUTCH CONTROL FOR TRACTORS
Filed Dec. 4, 1933 3 Sheets-Sheet 3
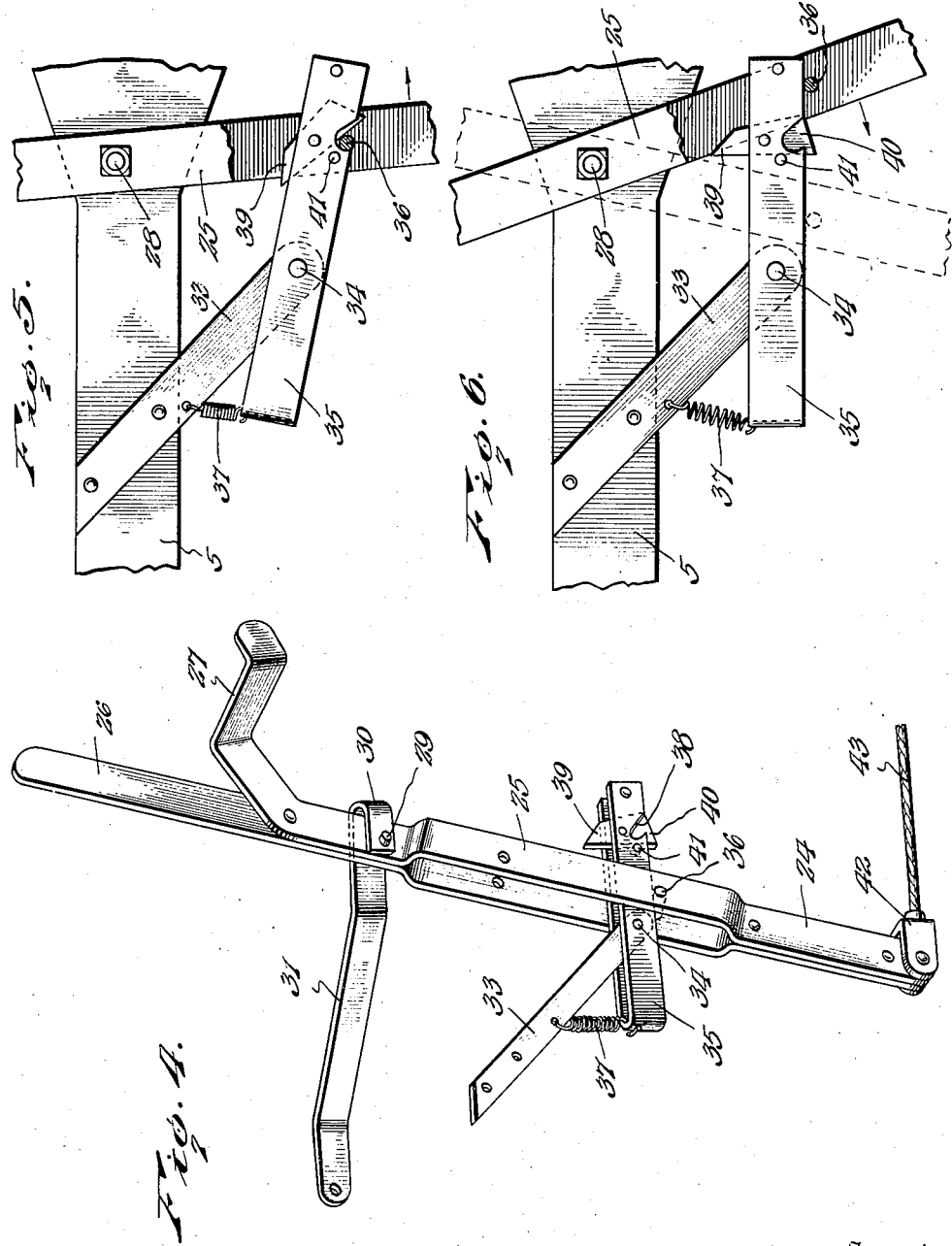
Inventor
Harry W. Eis.
By Lacey & Lacey, Attorneys Patented Mar. 19, 1935

1,995,094

UNITED STATES PATENT OFFICE 1,995,094

LINE DRIVE AND CLUTCH CONTROL FOR TRACTORS

Harry W. Eis, Holgate, Ohio

Application December 4, 1933, Serial No. 700,920

6 Claims. (Cl. 180—77)

This invention relates to line drive and clutch control mechanism for farm tractors.

The object of the invention is to provide means whereby a tractor may be guided and controlled from a remote point as, for instance, from a plow, harrow, or other implement or device being pulled by the tractor, thereby enabling one man to operate both the tractor and implement and dispensing with the services of a separate operator for the tractor.

A further object of the invention is to provide a remote control for tractors, the construction and operation of which is such as to insure a gradual and positive grip of the clutch in the same manner as if the clutch pedal were operated by the foot of an operator.

A further object is to so arrange the clutch operating means that the clutch can be moved to operative or inoperative position by means of a single rope or cable leading from the tractor to the implement drawn thereby, flexible cables being connected with the axle of the tractor and leading to the implement to permit guiding of the tractor from said implement.

A further object is to control the operation of the tractor pulley from the implement being drawn, and means whereby the tractor clutch and pulley may be operated manually directly from the tractor.

A further object is to provide a novel form of latch or detent which coacts with a locking notch and pin to hold the operating lever in clutch-disengaged position, said detent being operable to close the notch and permit the lever to move to clutch-engaging position.

A still further object of the invention is generally to improve this class of devices so as to increase their utility, durability and efficiency.

In the drawings forming part of this specification and in which similar numerals of reference indicate corresponding parts in all the figures of the drawings, Figure 1 is a side elevation of a tractor provided with a line drive and clutch control constructed in accordance with the present invention, Figure 2 is a top plan view of Figure 1, Figure 3 is a detail perspective view of the means employed for guiding the tractor, Figure 4 is a perspective view of the clutch operating lever and its associated parts detached and showing the lever in clutch-engaging position, Figure 5 is a detail side elevation showing the pin seated in the notch and locking the operating lever in clutch-disengaged position, Figure 6 is a similar view showing the pin released from the locking notch and the operating lever ready to move to clutch-engaging position.

The improved line drive and clutch control forming the subject-matter of the present invention is principally designed for attachment to tractors, and by way of illustration is shown in connection with a tractor of conventional construction in which 5 designates the chassis, 6 the front wheel, 7 the steering rod, 8 the engine and 9 a lever operatively connected with the clutch, indicated at 10. The tractor is also provided with the usual pulley 11 and driver's seat 12. The purpose of the invention is to control the tractor from a remote point, such as from a plow, harrow, or other implement, not shown, drawn by the tractor and to enable the operator on said implement to guide or steer the tractor there is provided on each side of the machine depending levers or supports 13 having their upper ends bolted at 14 to the side bars of the chassis and their lower ends bent to form sockets 15 in which are pivotally mounted at 16 the lower ends of upright bars 17. Riveted or otherwise rigidly secured to the fork of the front wheel 6 are oppositely disposed brackets 18 having openings formed therein adapted to receive suitable eyes 19 formed on the adjacent ends of connecting rods 20, the opposite ends of the connecting rods being pivotally united at 21 with the adjacent bars 17 at points a short distance above the pivots 16 of the bars. Secured in any suitable manner to the upper ends of the bars 17 are pulleys 17' over which extend flexible cords or cables 22 arranged one on each side of the tractor, as shown, one end of each cable being connected with the differential housing at 18' and the other end thereof extended under suitable guide pulleys 23 mounted on the seat 12 of the tractor and thence to the implement being drawn by the tractor so that an operator on the implement, by pulling rearwardly on either cable may effectually guide the movements of said tractor.

The clutch control mechanism comprises an operating lever 24 preferably formed of parallel bars having their intermediate portions spaced apart to form a vertical yoke 25, one of the bars being extended vertically above the yoke and terminating in an operating handle 26 and the other bar being bent laterally to form a foot pedal 27. The operating lever 24 is pivotally mounted on the frame or chassis of the tractor by means of a bolt 28 extending through the yoke 25, as shown, and pivotally connected at 29 to the lever, immediately above the yoke 25, is the hooked end 30 of a bar or link 31, the opposite end of which is pivotally connected at 32 with the clutch lever 9 so that pivotal movement of the operating lever will effect engagement and disengagement of the clutch 10. Rigidly secured to the frame of the tractor in front of the operating lever is a depending bar or support 33 and pivotally mounted at 34 on the lower end of said support is an auxiliary yoke 35 which extends through the main yoke 25 and normally rests on a locking pin 36 extending transversely of the main yoke, as shown. Secured to the support 33 is one end of a coil spring 37, the opposite end of which is secured to the closed end of the auxiliary yoke 35 and tends to exert a constant upward pull on said auxiliary yoke and thereby normally and yieldably hold the lower edge of the auxiliary yoke in contact with the locking pin 36. The side bars forming the auxiliary yoke 35, near the open end of the yoke, are formed with transversely alined locking notches or recesses 38 adapted to receive the pin 36, as will be more fully described hereinafter. Pivotally mounted between the side bars of the auxiliary yoke, at the open end of the yoke, is a latch or detent 39, the lower end of which is inclined upwardly, as indicated at 40, and normally closes the notch 38. The detent or latch 39 is mounted for free pivotal movement in the auxiliary yoke 35 and is so constructed that when the lower end of the operating lever 24 is moved in the direction of the implement being drawn, the pin 36 will engage the projecting end of the detent 39 and move said detent out of the path of the locking notch 38 so that when the pin 36 reaches the notch, the spring 37 will cause the pin to enter the notch and thus hold the operating lever 24 in set position and the clutch in disengaged position. A stop pin 41 is preferably mounted on the auxiliary yoke to limit the pivotal swinging movement of the detent 39. Pivotally mounted on the lower end of the lever 24 is a clip or clevis 42 to which is secured one end of a flexible rope or cable 43 leading rearwardly through a guide loop 44 secured to the tractor frame and thence to the implement being drawn by the tractor so that an operator on said implement, by exerting a longitudinal pull on the cable, may actuate the lever 24 to engage or disengage the clutch and thus control the action of the motor. As the pulley 11 is connected with the motor it follows that movement of the operating lever 24 will also control the operation of said pulley.

When the device is attached to a tractor, the usual worm wheel on the rod 7 is disengaged from the worm gear and said worm wheel covered by a suitable cap or housing 45 so as to protect the worm wheel from dirt and other foreign matter. As previously stated, the cables 22 and 43 extend rearwardly to a plow, harrow, or other implement or device to be operated and the movements of the tractor may be readily controlled by the operator on said implement by pulling longitudinally on either of the cables 22. When it is desired to disengage the clutch, the operator on the implement being drawn, exerts a rearward pull on the cable 43 which tilts the lower end of the operating lever 24 on its pivot 28 and moves said lever rearwardly until the locking pin 36 engages the lower or projecting edge of the detent 39 so as to move the detent out of the path of the pin 36 and thus permit the pin to enter the notch 38. During this action of the lever 24, the upper end of said lever will be moved forwardly and through the medium of the link 31 throw the clutch lever 10 to the dotted line position shown in Figure 1 of the drawings and thus disengage the clutch so as to release the motor and in which position it will be held as long as the pin 36 is retained within the locking notch 38. To release the clutch, a further longitudinal pull is exerted on the cable 43 which causes the pin 36 to ride on the adjacent face of the detent 39, and out of the notch 38, as best shown in Figure 5 of the drawings, thereby permitting the detent to drop by gravity to the position shown in Figure 6, when, if a slight slack is given the cable 43, the lever 24 will return to normal position under the action of the spring in the clutch, thereby engaging the clutch and causing the tractor to move forward. As the pin 36 moves forwardly, it will ride over the lower inclined face 40 of the detent and force the latter against the stop 41 so as to permit the pin to clear the notch and in which position the lower end of the detent will project slightly below the auxiliary yoke 25 and in position to be again tilted by the pin 36 when a further rearward movement is imparted to the operating lever. When no implement is being drawn and the operator is seated on the seat 12 of the tractor, the movement of the clutch may be effected by either manipulating the handle 26 of the operating lever or the foot pedal 27, it being, of course, understood that the movement of the operating lever will also engage and disengage the pulley 11 at the same time that the clutch is actuated.

In order to assist in steering the tractor and keep the tractor running straight ahead while the lines are held slack in the hands of the operator, there are provided coil springs 46 disposed one on each side of the front wheel 6. One end of each spring 46 is connected with the bracket 13 while the other end thereof is connected with a rod 47 having a terminal eye 48 which slidably engages the connecting rod 20, there being a clamp 49 slidably mounted on each connecting rod 20 and held in adjusted position on the rod by a clamping screw 50. The tension of the springs 46 may be regulated by sliding the clamp 49 against the adjacent eye 48 and then tightening the clamping screw 50.

From the foregoing description, it is thought that the construction and operation of the device will be readily understood by those skilled in the art and further description thereof is deemed unnecessary.

Having thus described the invention, I claim:

1. The combination with a tractor including a clutch, of an operating lever pivotally mounted on one side of the tractor and having its intermediate portion formed with a yoke and its upper portion terminating in an operating handle, a foot lever extending laterally from the operating handle, a hanger secured to the tractor, an auxiliary yoke operating in the first-mentioned yoke and pivotally mounted on the hanger, a pin extending transversely of the lever yoke, there being a locking notch formed in the auxiliary yoke, a detent pivotally mounted in said auxiliary yoke and having its lower end inclined and normally extending below the auxiliary yoke, a spring forming a connection between the hanger and closed end of the auxiliary yoke, a connection between the upper portion of the operating lever and clutch, and a cable connected with the lower portion of the operating lever and operable from an implement drawn by the tractor for tilting the lever and disengaging the clutch, the movement of the lever in one direction causing the pin to move the detent and permit said pin to enter the notch and movement of the lever in the opposite direction causing the pin to ride over the lower end of the detent.

2. The combination with a tractor including a clutch, of an operating lever pivotally mounted on the tractor and operatively connected with the clutch, a locking pin disposed transversely of the lever, a yoke pivotally mounted on the tractor frame and normally and yieldably bearing against the pin, said yoke having its lower edge provided with transversely alined locking notches, a detent pivotally mounted in the yoke between said notches and having its lower end inclined and normally projecting below the yoke, means for limiting the pivotal movement of the detent, and a cable connected with the lower end of the operating lever and operable from an implement drawn by the tractor for tilting the lever to disengage the clutch, movement of the lever in one direction causing the pin to bear against and tilt the lower end of the detent to expose the notch and permit the locking pin to enter said notch and movement of the lever in the other direction causing the pin to ride over the lower edge of the detent and actuate the lever to engage the clutch.

3. The combination with a tractor including a clutch, of an operating lever pivotally mounted on the tractor and operatively connected with the clutch, a locking pin carried by the lever, a yoke carried by the tractor and yieldably supported in engagement with the pin and provided with a notch in its lower edge, means for rocking the lever, a detent pivoted in the yoke above the notch to normally close the notch with its lower end projecting below the pin, and one side edge presented to the pin, the movement of the lever to clutch-released position causing the pin to rock the detent and enter the notch to lock the parts in said position, further movement of the lever in the same direction removing the pin from the notch and releasing the detent to again close the notch, and movement of the lever to clutch-engaged position causing the pin to ride across the lower end of the detent and clear the notch.

4. The combination with a tractor including a clutch, of an operating lever pivotally mounted on the tractor and operatively connected with the clutch, said lever having an intermediate vertically-disposed yoke, a pin extending transversely of the yoke, a hanger, an auxiliary yoke pivotally mounted on the hanger and extending within the yoke of the lever, a resilient connection between one end of the auxiliary yoke and the hanger for normally and yieldably holding the yoke in engagement with the pin, said auxiliary yoke having a notch in its lower edge, means for rocking the lever, and a detent pivoted in the auxiliary yoke above the notch to normally close the notch with its lower end projecting below the notch and one side edge presented to the pin, the movement of the lever to clutch-released position causing the pin to rock the detent and enter the notch to lock the parts in said position, further movement of the lever in the same direction removing the pin from the notch and releasing the detent to again close the notch, and movement of the lever to clutch-engaged position causing the pin to ride across the lower end of the detent and clear the notch.

5. The combination with a tractor including a clutch, of an operating lever pivotally mounted on the tractor, a bar forming a connection between the upper end of the lever and the clutch, a transverse pin carried by the intermediate portion of the lever, a horizontally disposed yoke pivotally mounted on the tractor for tilting movement and resting normally on said pin, means for yieldably holding the yoke in engagement with the pin, there being a notch in the lower edge of the yoke near one end thereof, means for rocking the lever, and a detent pivoted in the yoke above the notch to normally close the notch with its lower end projecting below the notch and one side edge presented to the pin, movement of the lever to clutch-released position causing the pin to rock the detent and enter the notch to lock the parts in said position, further movement of the lever in the same direction removing the pin from the notch and releasing the detent to again close the notch, the movement of the lever to clutch-engaged position causing the pin to ride across the lower end of the detent and clear the notch.

6. The combination with a tractor including a clutch, of an operating lever pivotally mounted on the tractor and operatively connected with the clutch, a locking pin carried by the lever, a yoke pivotally mounted on the tractor frame and normally and yieldably bearing upon the pin, said yoke having a locking notch in its lower edge, a detent pivotally mounted on the yoke above said notch and normally closing the notch with its lower forward corner presented to the locking pin below the notch, a stop on the yoke adjacent the forward edge of the detent, and a cable connected to the lower end of the lever and operable from an implement drawn by the tractor for tilting the lever in one direction to disengage the clutch and tilt the detent to permit the pin to enter the locking notch, further movement of the lever in the same direction causing the pin to leave the notch and the detent to resume normal position closing the notch, and return movement of the lever causing the pin to ride under the lower end edge of the detent to clear the notch and the clutch to be engaged.

HARRY W. EIS. [L. S.]